Figure 1:
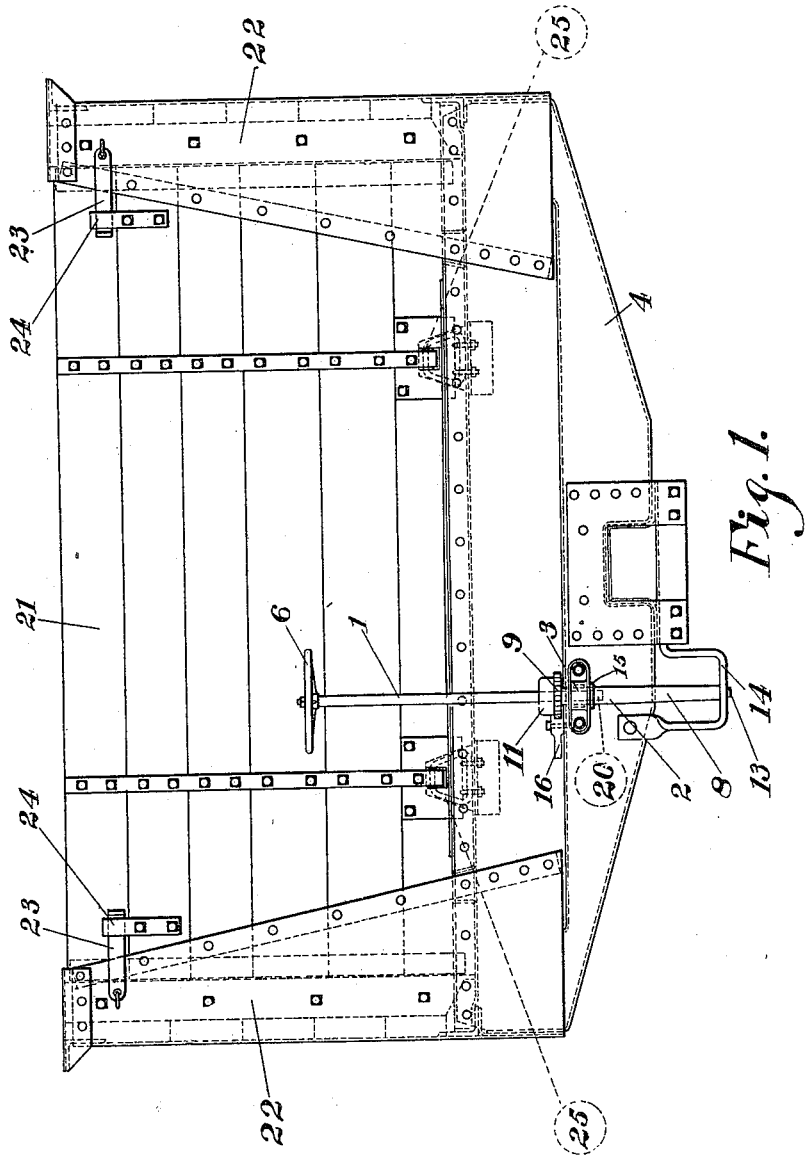

C. A. LINDSTRÖM.
BRAKE STAFF.
APPLICATION FILED AUG. 17, 1910.

993,386.

Patented May 30, 1911.
3 SHEETS—SHEET 1.

Witnesses
Inventor

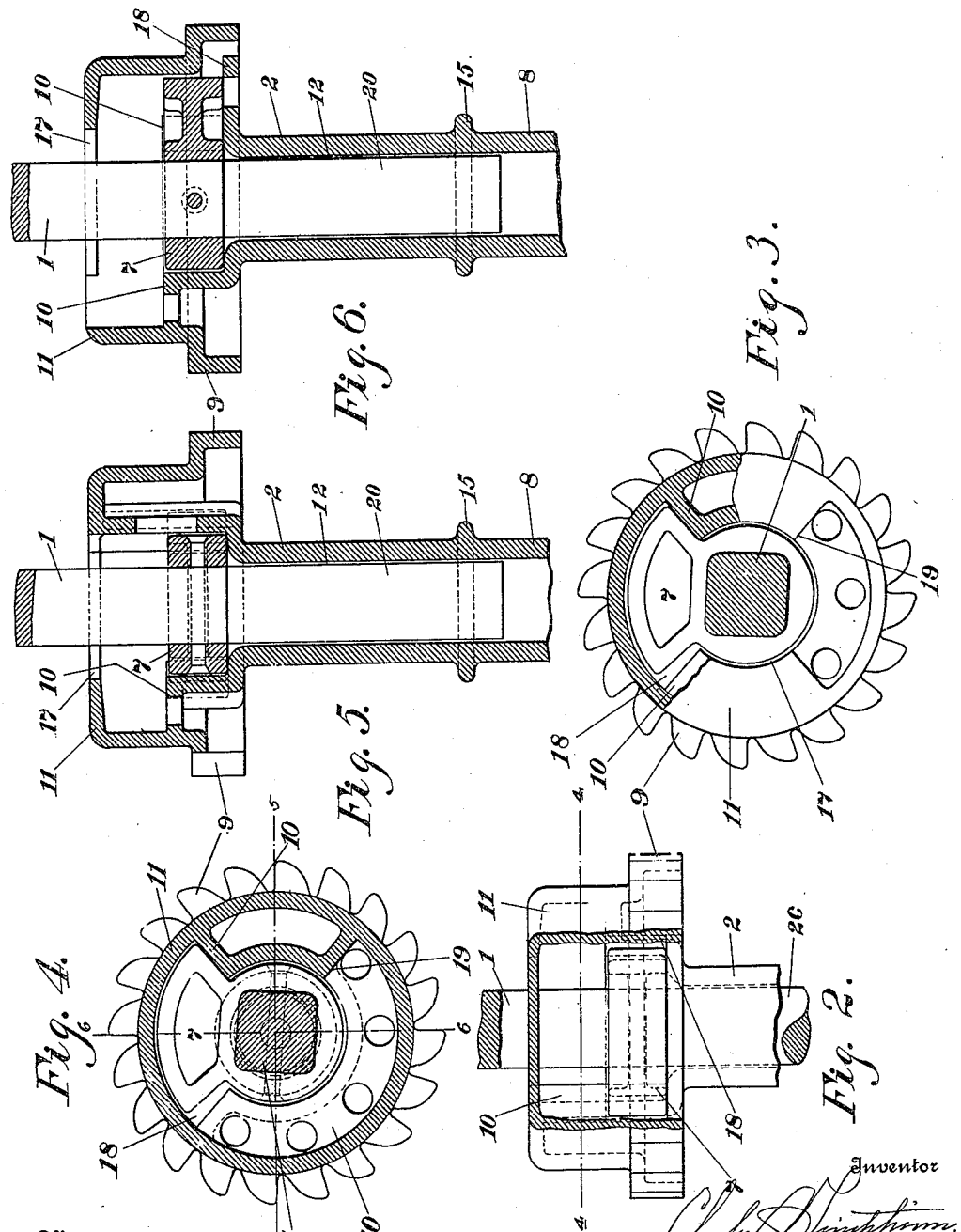

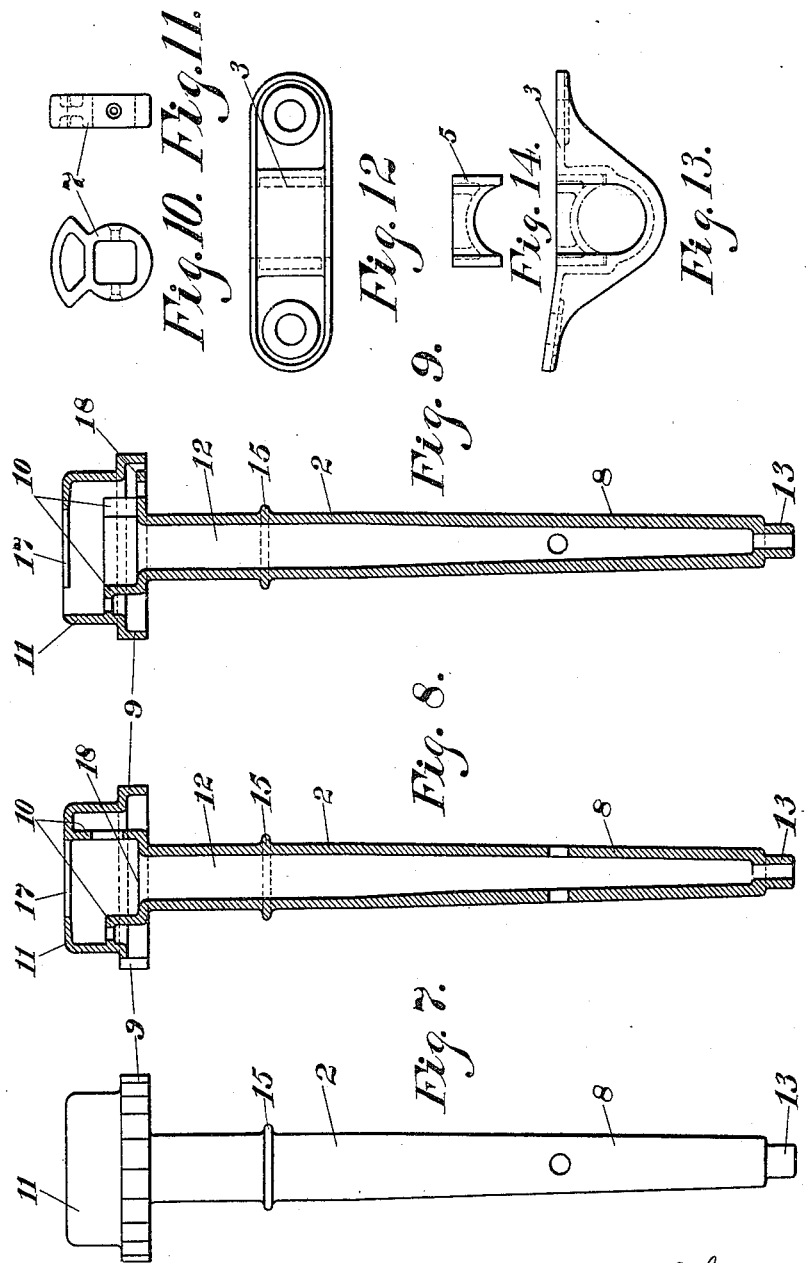

UNITED STATES PATENT OFFICE.

CHARLES A. LINDSTRÖM, OF PITTSBURG, PENNSYLVANIA, ASSIGNOR TO PRESSED STEEL CAR COMPANY, OF PITTSBURG, PENNSYLVANIA, A CORPORATION OF NEW JERSEY.

BRAKE-STAFF.

993,386.     Specification of Letters Patent.     Patented May 30, 1911.

Application filed August 17, 1910. Serial No. 577,655.

*To all whom it may concern:*

Be it known that I, CHARLES A. LINDSTRÖM, a citizen of the United States, residing at Pittsburg, northside, in the county of Allegheny and State of Pennsylvania, have invented certain new and useful Improvements in Brake-Staffs, of which the following is a specification.

An object of the present invention is to provide a brake staff of that type for use in flat cars or in freight cars which have drop-ends or end doors, which are necessary where lading of great length is to be carried, or where lading of great weight is to be distributed over two cars.

A specific object of the present invention is to provide a knock-down, collapsible or separable brake staff, the operating portion of which may be moved out of the way from a point at the end sill when the car is used as above described, so as not to interfere with the lading extending between the cars, and which may be readily replaced when the disposition of the lading will not interfere with its use.

A more specific object of the present invention is to provide a brake staff so constructed that the same may be readily thus separated into two parts and yet not automatically separated due to jolting of the car.

Such a brake staff is hereinafter fully described and is clearly shown in the accompanying drawings in which like reference characters refer to like parts, and in which—

Figure 1 is an end elevation of a drop-end car, of the gondola type, showing my improved brake staff mounted thereon; Fig. 2 is an enlarged detail view, with parts broken away and in section, of the middle or clutch and ratchet portion of the staff where the operating and the operated parts of the staff are joined; Fig. 3 is a plan view of the same; Fig. 4 is a sectional plan view of the same on the line 4—4, Fig. 2; Fig. 5 is a vertical section of the same on the line 5—5, Fig. 4; Fig. 6 is a like view on the line 6—6, Fig. 4; Fig. 7 is a detail elevation of the lower operated or chain-winding portion of the brake staff with the integral clutch housing and ratchet; Figs. 8 and 9 are vertical sections of the same at a right angle to each other; Figs. 10 and 11 are detail views of the clutch toe, projection or member applied to the upper or operating portion of the brake staff; Fig. 12 is a face view of the brake staff bearing; Fig. 13 is a plan view of the same, and Fig. 14 is a detail plan view of the bearing keeper forming a part of the brake staff bearing shown in Fig. 12.

Referring now in detail to the drawings, 1 represents the upper or operating part of the staff and 2 is the operated or chain-winding part of the staff, while 3 is the staff bearing bolted or riveted to the end sill 4 of the car. Staff bearing 3 is provided with a removable portion or keeper 5 which is inserted in the sill side of the bearing in suitable recesses and held in place by the sill 4 when bearing 3 is secured thereto. Keeper 5 permits ready removal of the staff from bearing 3 when bearing 3 is removed from end sill 4.

The upper or operating part 1 of the staff is made similar to the upper portion of any ordinary brake staff, being provided with the usual operating wheel 6, but the same is made separate from the lower, operated or chain-winding part 2. Part 1 has secured thereto at a point near to but above its lower end, a toe, projection, lug or member 7 which forms a clutch member which operates the lower or operated part 2 of the staff.

The lower, chain-winding or operated part 2 of the staff is specially shaped, in the drawings being shown as a tubular casting, to constitute a chain-winding portion 8, a ratchet 9, a clutch abutment 10, a clutch housing 11 and a socket 12 for the upper or operating part 1 of the staff.

The lower part 2 of the staff is of greater diameter than the upper part 1. There are several advantages in making this part of the staff of greater diameter, among which might be mentioned the advantage of increasing the winding area 8 for the chain, resulting in greater rapidity in applying the brakes. The increase in the diameter of part 2 at its winding portion 8 is, however, not so great as to materially decrease the operating power of the staff. Another advantage of such increase in diameter of part 2 is that it materially increases the strength of this part of the staff which has formed integral therewith the ratchet 9 which is depended upon to hold the brakes in applied positions. A further advantage of increasing the diameter of part 2 resides in the possibility of forming the socket or bearing 12 for the lower end of the upper or operating part 1 of the staff.

The lower end of part 2 of the staff is contracted at 13 and inserted in a perforation in the bracket 14 which is suitably mounted on the end sill 4. Part 2 is also provided with an integral annular shoulder 15 which bears against the under side of the staff bearing 3 and which, together with bearing 3 and bracket 14 prevents vertical displacement of part 2. Ratchet 9 is formed at the upper end of part 2 and coöperates with a pawl or dog 16, pivotally mounted on the end sill 4 adjacent ratchet 9. Clutch housing 11 is located above the ratchet 9 and is cylindrical in shape, being closed on top save for an opening 17 which is substantially the same shape, although slightly larger than the toe, projection or member 7 mounted upon the upper part 1 of the brake staff. Such opening 17 is circular at the central portion of the top of the housing 11 and has a wedge-shaped extension toward the circumference of housing 11. The inside of housing 11 is hollow, but provided with two levels, one level being formed by the upper surface or top of clutch abutment 10 and extending at an angle to opening 17 from immediately beneath the outer wedge-shaped portion of opening 17 to a line adjacent and above a second level 18. The lower or second level 18 is but slightly greater in extent than the outer wedge-shape portion of the toe, projection or member 7 so that it forms the bottom of a pocket or recess, of substantially the same shape, the end walls of which are formed by the opposite ends or opposing faces of the clutch abutment 10, a third wall of which is formed by the curved wall of the housing 11 and which pocket or recess is covered by the top of housing 11 and open toward the center of the housing. This pocket is adapted to receive loosely the clutch toe, projection or member 7, after the latter has been passed through opening 17 in the top of the housing 11, turned through the tortuous passageway formed by the top of the abutment 10, the side wall and top of housing 11 until the toe, projection or member 7 registers with and seats in said pocket or recess by dropping to the level 18. The wedge-shaped extension of the opening 17 is on the diametrically opposite side of the housing 11 from the pocket or recess formed by the level 18, abutment 10 and the wall of the housing 11. The top of the housing 11, extending over such pocket, forms a baffle plate and prevents separation of the parts 1 and 2, of the staff, without first raising to the level of the top of the abutment 10, and then turning until toe 7 registers with the opening 17, so that it is not possible for the parts 1 and 2 to become automatically separated should member 7 become dislocated from its recess, due to an extra severe jolt or shock, and yet the parts may be very readily separated when desired.

For the purpose of facilitating intentional removal or separation of part 1 from part 2, a portion of the abutment 10 is extended upwardly to the top of the housing 11 to form an abutment 19, which is located at one side of the wedge-shaped extension of the opening 17, so that when the toe, lug or member 7 is raised to the top of the abutment 10 and turned over such surface it finally strikes the abutment 19 and is then in registration with the wedge-shaped extension of the opening 17, in which position the same may be easily lifted from the housing and the parts thus separated.

The toe, lug or member 7 is secured to the part 1 a sufficient distance above its lower end to constitute the lower end of part 1 a firm centering means or spindle 20 which prevents the upper part 1 of the staff from wabbling, and which is rounded to turn freely in tubular part 2. As shown in the drawings, the lower end or spindle 20 of part 1 extends down to a point slightly below the bearing shoulder 15.

On the car shown in the drawings, 21 is the drop-end; 22 the wedge-shaped stationary portion of the car end; 23 the latches; 24 the latch keepers; while 25 represents the hinges of the drop-end 21.

An advantage of the present invention is, that when it is necessary, owing to the length of the lading, to use two flat cars, or two cars with drop-ends, and extend the lading from one car to the adjacent car, in which event the upper part 1 of the brake staff would be in the way, such upper part 1 may be, in the manner already described, removed from the lower part 2 and stored in any convenient position about the car where the same will not be in the way, where it will not be damaged, or where it will not likely be lost.

Having thus described my invention, the following is what I claim as new therein and desire to secure by Letters Patent:

1. In a brake staff for railway cars, a chain-winding part and an operating part, one of said parts having formed therein a recess, the other part having a projection adapted to be located in said recess to operatively connect the parts and means to prevent automatic separation of said parts.

2. In a brake staff for railway cars, a chain-winding part and an operating part, one of said parts having formed therein a recess, the other part having a projection adapted to be located in said recess to operatively connect the parts, and a baffle opposite the recess to prevent automatic separation of said parts upon dislocation of the projection from the recess.

3. In a brake staff, an operated part and an operating part, one of said parts being formed with a housing and a recess in said housing, the other of said parts being provided with a lateral projection adapted to be located in said recess to operatively connect the parts.

4. In a brake staff, an operated part and an operating part, one of said parts being formed with a housing, a recess in said housing, an opening in said housing and a passageway between said opening and recess extending at an angle to said opening and recess, the other part having a projection adapted to be passed through said opening, through said passageway and seated in said recess to operatively connect the parts.

5. In a brake staff, an operated part and an operating part, one of said parts being formed with a housing, a recess in said housing, an opening in said housing on the side thereof opposite said recess and a passageway connecting said recess and opening, the other part having a projection adapted to be passed through said opening, through said passageway and into said recess to operatively connect said parts to each other.

6. In a brake staff, an operated part and an operating part, one of said parts being formed with a housing and a recess in said housing, the other of said parts being provided with a projection adapted to be located in said recess to operatively connect the parts, said housing forming a baffle to prevent automatic separation of the parts.

7. In a brake staff, an operated part and an operating part, one of said parts being provided with a housing having a socket to receive the other part and forming a bearing therefor, said housing also having formed therein a recess, the other part of the staff adapted to seat in said socket and having a projection adapted to seat in said recess to operatively connect the parts.

8. In a brake staff, an operated part and an operating part, one of said parts being provided with a housing having a socket to provide a bearing for the other part of the staff, said housing also having a recess, and an opening in the wall of the housing connected to said recess by a tortuous passageway, the second part of the staff adapted to seat in said socket and being provided with a projection adapted to be passed through said opening, through the tortuous passageway and seated in said recess to operatively connect the parts.

9. In a brake staff, an operated part and an operating part, said operated part having at its upper end a housing having a central socket to form a bearing for the operating part, said housing being provided with a recess on one side thereof and above the socket, an opening at the opposite side of said housing in its top and a passageway connecting said opening and recess, the operating part adapted to seat at its lower end in said socket and being provided at a point above its lower end with a projection adapted to be passed through said opening, through said passageway and seated in said recess to operatively connect the parts.

10. In a brake staff, an operated part and an operating part in combination with a housing integral with one of said parts, means operatively connecting said parts within said housing and a ratchet on said housing.

11. In a brake staff, an operated part and an operating part in combination with a housing integral with one of said parts, means operatively connecting said parts within said housing and a ratchet integral with said housing.

12. In a collapsible brake staff comprising a plurality of parts, one of said parts being formed of a casting having an integral clutch housing and ratchet and forming a bearing for the other member, said other member being also provided with a clutch member located within said housing.

13. A brake staff comprising an operating and operated part, one of said parts being tubular and provided with a housing and a clutch member within said housing, the other of said parts extending into the first-mentioned part and having a clutch member mounted therein at a point within the housing to coöperate with the first-mentioned clutch member.

14. In a brake staff, an operating part and a chain-winding part of greater diameter than said operating part, said chain-winding part being provided with a combined ratchet wheel and clutch housing and a clutch within said housing operatively connecting said parts to each other.

15. In a brake staff, the combination with an operating part and an operated part, a housing integral with one part and forming a bearing for the end of the other part, and a clutch operatively connecting said parts and located in said housing.

16. In a brake staff, the combination with an upper part and a lower part, said lower part being provided with a housing for the lower end of said upper part, and a clutch operatively connecting said parts to each other and located in said housing.

17. In a brake staff, an upper part and a lower part formed with a bearing for said upper part, in combination with a clutch member on said lower part and a coöperating clutch member on said upper part.

18. In a brake staff, an upper part, a lower part having a bearing formed therein for said upper part and a clutch operatively connecting said parts.

19. In a brake staff, an operating part and a cast metal tubular part having a chain-winding portion of greater diameter than the diameter of the operating part, said tubular part having at its upper end and integral therewith a clutch abutment, a housing and a ratchet, the operating part at its lower end projecting into the tubular chain-winding part, the latter forming a bearing for the same.

In testimony whereof I affix my signature in presence of two witnesses.

CHARLES A. LINDSTRÖM.

Witnesses:
FRANK E. MILLER,
LELA M. GRUNDER.

Copies of this patent may be obtained for five cents each, by addressing the "Commissioner of Patents, Washington, D. C."